United States Patent

Ferguson

(10) Patent No.: US 7,920,758 B2
(45) Date of Patent: Apr. 5, 2011

(54) MEASUREMENT APPARATUS AND METHOD OF MEASUREMENT OF VIDEO SPATIAL SCALE, OFFSET AND CROPPING

(75) Inventor: Kevin M. Ferguson, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 789 days.

(21) Appl. No.: 11/944,050

(22) Filed: Nov. 21, 2007

(65) Prior Publication Data

US 2008/0152257 A1 Jun. 26, 2008

Related U.S. Application Data

(60) Provisional application No. 60/867,087, filed on Nov. 22, 2006.

(51) Int. Cl.
*G06K 9/36* (2006.01)
(52) U.S. Cl. ......... 382/281; 382/260; 382/274; 382/275
(58) Field of Classification Search .................. 382/260, 382/274, 275, 281
See application file for complete search history.

(56) References Cited

U.S. PATENT DOCUMENTS

| | | | |
|---|---|---|---|
| 6,278,970 B1 * | 8/2001 | Milner | 704/203 |
| 6,985,555 B2 * | 1/2006 | Endo | 378/98.11 |
| 7,214,947 B2 * | 5/2007 | Bueno et al. | 250/370.11 |
| 7,227,926 B2 * | 6/2007 | Kameshima et al. | 378/98.9 |

* cited by examiner

*Primary Examiner* — Yosef Kassa
(74) *Attorney, Agent, or Firm* — Matthew D. Rabdau

(57) ABSTRACT

A method and apparatus are provided to measure spatial distortion. Measure and remove borders; and rescale the active test image, the active reference image, or both, such that they are the same size. A representative line is obtained, or selected, from each image providing a reference representative line (ReferenceRL) and a test representative line (TestRL). A local Pearson' cross-correlation coefficient (LPCCC) image is created from both the ReferenceRL and the TestRL at different horizontal shifts. The highest average intensity line across the LPCCC image is found as the coordinates of the corresponding Hough Transform image pixel with maximum intensity is determined. The Hough Transform Theta and R are converted to spatial scale and offset. The crude and refined offsets and scale values are combined to produce total horizontal and vertical scale offset values. These spatial measurements can then be provided.

18 Claims, 9 Drawing Sheets

MEASUREMENT APPARATUS AND METHOD OF MEASUREMENT OF VIDEO SPATIAL SCALE, OFFSET AND CROPPING

CROSS-REFERENCE TO RELATED APPLICATIONS

This application claims the benefit of U.S. Provisional Patent Application No. 60/867,087 titled "MEASUREMENT APPARATUS AND METHOD OF MEASUREMENT OF VIDEO SPATIAL SCALE, OFFSET AND CROPPING" which was filed on Nov. 22, 2006.

BACKGROUND

The present apparatus and method relate to video technology, and more particularly to video measurement.

With the proliferation of video formats and devices, changes in image size, registration and cropping occur more frequently. Video reformatting for repurposing is becoming more common. For example, sending 720 sample per line 601 SD video signal as a 704 ATSC digital broadcast signal would require reformatting. Similarly, conversion of a 720 SD video signal similar to that shown in FIG. 1 (Prior Art) to a 1920 HD video signal similar to that shown in FIG. 2 (Prior Art), which result from simulcast SD and HD, also require reformatting. In addition to reformatting due to changing broadcast options, conversion of video for use on mobile phones or PDAs, such as conversion of HD video to QCIF for mobile phones, or PDA video, also require reformatting. This reformatting may require a change in image size, or a spatial shift referred to as registration, or a loss of image near the image borders, also referred to as cropping. Such reformatting can require that images are fit into a new aspect ratio, for example 16:9 versus 4:3. Reformatting can also require truncation, or cropping, on the sides of images, or adding blank border segments on the sides, or above or below the image, for example in the case of letterboxed images. This reformatting presents problems for equipment manufactures, broadcasters, editors, and other video professionals and service providers. Processing equipment may be set in incorrect modes, malfunction, or standards may vary, for example as in the 720 to 704 pixel example provided above.

A measurement instrument capable of executing a method of measuring spatial distortion, scale, offset or shift, and cropping of video output would be useful. In addition, picture quality measurements will also benefit from spatial alignment between a test and reference sequence pair for full reference measurements.

In the past, this has been achieved, at least in part, using a proprietary stripe placed over the original video image. This is intrusive and requires that test and reference video sequences both have the stripe, which requires that the stripe be added prior to video compression or other processing required for transmission, or storage. This has been a limitation of automated picture quality measurement applications, because in some applications it is not practical or desirable to add the stripe once the need for making a measurement arises.

An automated method of measuring spatial distortion for automated video measurement (VM) applications such as consumer electronics video output verification would be useful. A method for automated spatial alignment for use in connection with automatic picture quality (PQ) measurements would also be useful. It would be useful if the method were robust in the presence of digital compression artifacts, random noise, quantization error, nonlinear distortion, linear distortion, and interference. It would also be useful for this method to be able to operate without prior knowledge of the video content, including any stripe added to the video signal, aspect ratio, DUT pixel clock, or other indications of the likely horizontal or vertical scaling, offset or cropping. The practical utility of the method would improve if the method provided both accuracy and computational efficiency. Computational efficiency refers to the amount of processing required to achieve a given accuracy. The less processing required to achieve a desired level of accuracy the better the computational efficiency.

What is needed is an accurate and computationally efficient method of spatial distortion measurement that is robust over a wide range of scale ratios from less than 0.1 to greater than 10.0, significant cropping from less than 0.65 to greater than 1.35 as well as addressing other impairments of the prior art. The spatial distortion measurements that could be made might include spatial scale, shift, as well as cropping in both the horizontal and the vertical dimensions. It would also be useful, if this method could be at least partially, if not entirely, automated.

SUMMARY

Accordingly, a method and apparatus are provided to measure spatial distortion. Measure and remove borders; and rescale the active test image, the active reference image, or both, such that they are the same size. In one embodiment, the larger of the two images is scaled down. In an alternative embodiment, the smaller image is scaled up.

A representative line is obtained, or selected, from each image providing a reference representative line (ReferenceRL) and a test representative line (TestRL). In an embodiment of the method, that maximum variance line method is used to select the TestRL. In an alternative embodiment, the TestRL is obtained by using a line averaging method, provided that the line averaging method obtains a resulting line with an edge.

A local Pearson' cross-correlation coefficient (LPCCC) image is created from both the ReferenceRL and the TestRL at different horizontal shifts.

Find the highest average intensity line across the LPCCC image, and then find the coordinates of the Hough Transform image pixel with maximum intensity.

Convert the Hough Transform Theta and R to spatial scale and offset.

Calculate refined scale and offset values for the vertical dimension.

Combine the crude and refined offsets and scale values to produce total horizontal and vertical scale and offset values.

These spatial measurements can then be provided to equipment manufactures, broadcasters, editors, and other video professionals and service providers, or provided to allow additional picture quality measurements to be made. This will enable the quality of video provided to end users to be measured, monitored and possibly improved.

DETAILED DESCRIPTION

Various approaches may be used to produce spatial distortion measurement. Some methods are not robust over scale ratios other than 1.0. These methods often require a priori knowledge of video content, such as with the TEKTRONIX® proprietary stripe used in the PQA200. Some alternatives may not require prior knowledge, such as those that use aggregate phase information from FFT coefficients to measure shifts (ANSI T.1.801.03-1996, 5.4 "Active video shift" and though 1-D applied to time instead of space, Jiujuai Lu's patent for "Fast Video Temporal Misalignment Estimation" (U.S. Pat. No. 6,751,360, or those that use variance of normalization difference images (ANSI T1.801.03-2003 6.1, "Spatial Registration"). FFT methods may be used to improve computational efficiency of 2-D cross-correlation (as in U.S. Pat. No. 6,751,360), but the scale issues in the spatial domain become scale issues in the frequency domain, which may limit them to scale ratios of 1.0.

Others are robust over scale ratios other than 1.0, but don't actually measure scale, rather they are used as part of recognition algorithms.

Additional alternatives provide robust scale ratios other than 1.0 and do measure scale, but use very crude and inaccurate methods of doing so; or measure scale accurately, but at the cost of complex, expensive, slower calculation methods, which are not computationally efficient. These alternatives include, for example 2-D cross-correlation between individual blocks or small image segments taken from the test image versus the reference image. This method is generally either fairly inaccurate over scales far from 1.0, because the correlations tend to become poor; or the complexity and computational cost becomes prohibitive, because all areas are searched with all combinations of horizontal and vertical shifts and scales. Computational cost as used herein refers to long processing times or extreme processing power, which would be economically expensive, and therefore possibly unfeasible for many applications.

Figure 1:
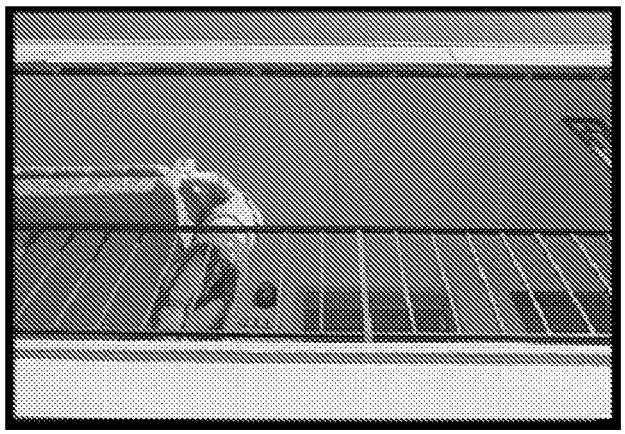
FIG. 1 is a standard definition (SD) frame
Figure 2:
FIG. 2 is a high definition (HD) frame corresponding to the SD frame in FIG. 1
Figure 3:
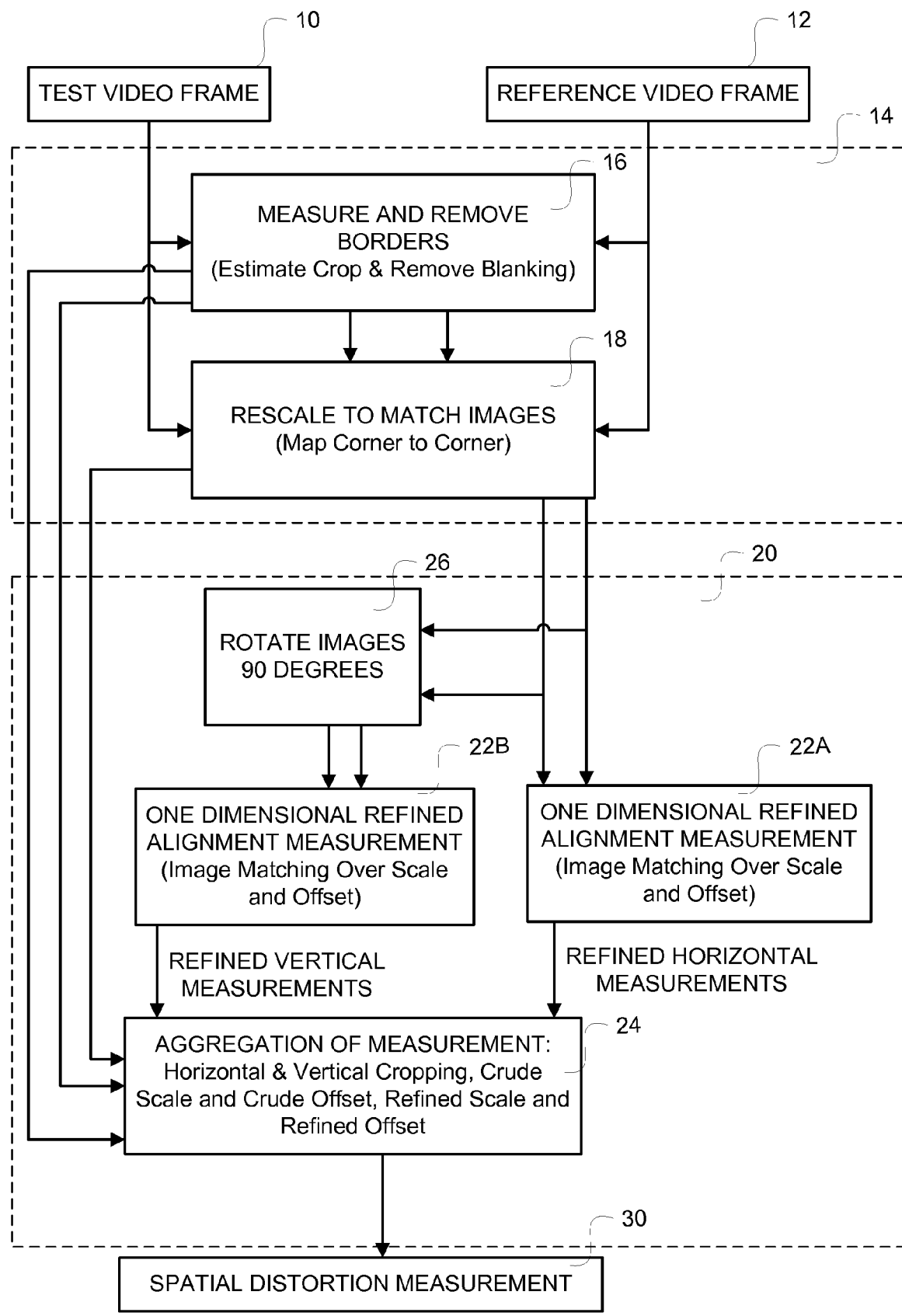
FIG. 3 is a block diagram for measuring video (image) spatial distortion including scale, offset and cropping parameters.
Figure 4:
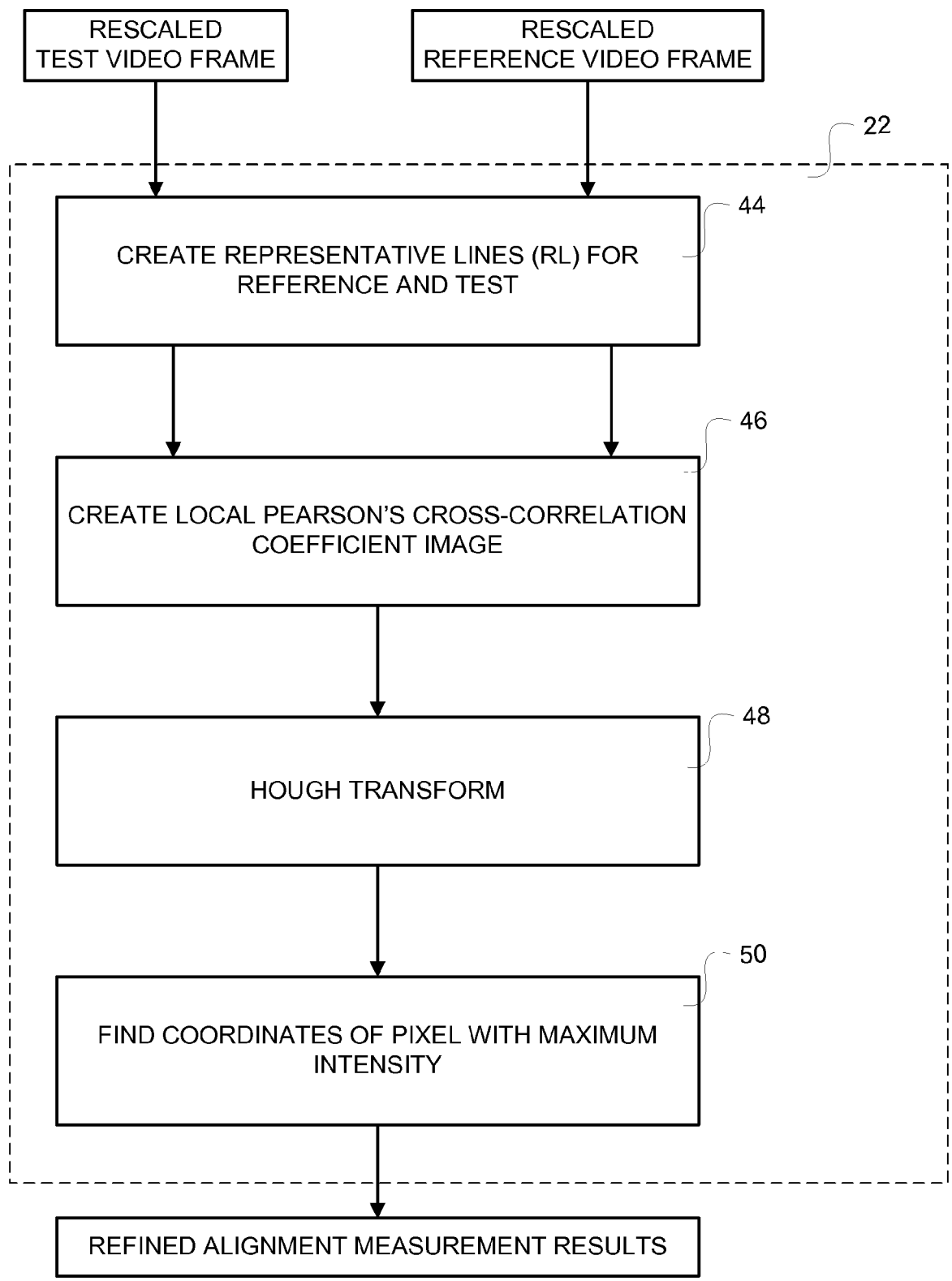
FIG. 4 is a block diagram for one dimensional refined alignment measurement.
Figure 5:
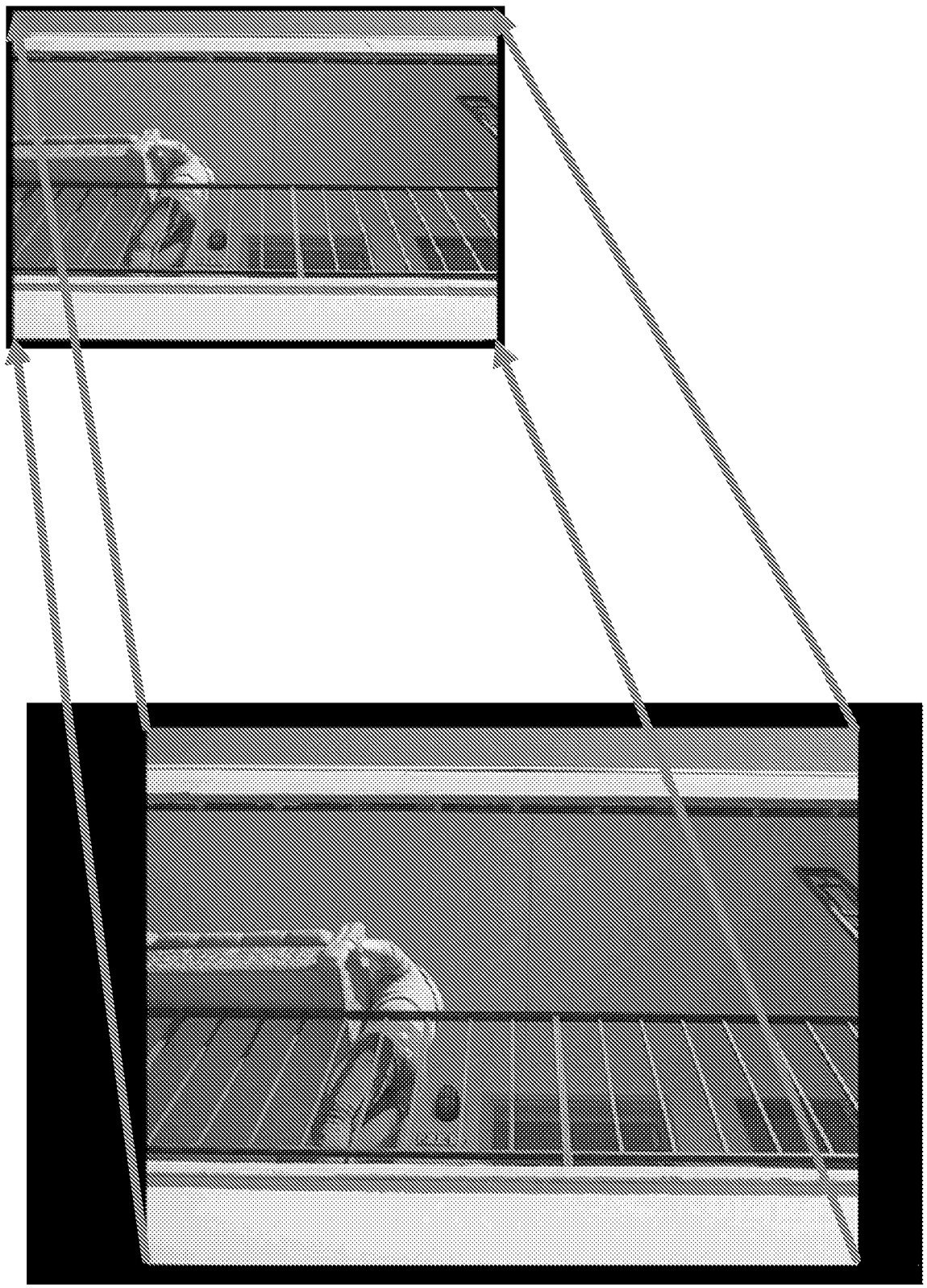
FIG. 5 is a depiction of a crude alignment between the SD frame of FIG. 1 and the HD frame of FIG. 2.

An embodiment of the present measurement is shown in FIGS. 3 and 4. The various blocks, or modules, shown in FIGS. 3 and 4 can be implemented as software running on a general purpose processor. Alternatively, they may be implemented using a combination of dedicated circuitry and software, or entirely as embedded code circuitry The circuitry may comprise a FPGA, ASIC, DSP, a general purpose processor, such as that used in personal computers, or combination of these and other elements.

As shown in FIG. 3, a test video frame 10 and a reference video frame 12 are input to crude alignment measurement module 14. The module 14 provides a blind corner to corner alignment. A border removal module 16 receives the test video frame 10 and the reference video frame 12 and measures and removes blanking, from either or both frames. The location of the edge of each test image video frame and reference image video frame is determined. In an embodiment of the present system, this is achieved by determining how many pixels on the right, left, top and bottom of an image video frame are blanking or border pixels, rather than active portion of the frame. The active portion refers to the portion of an image, or frame, that typically changes with time in a video sequence, which also corresponds to the portions of the video sequence that is typically of interest to the viewer.

In an embodiment of the present system, a resealing module 18 receives the test video frame and the reference video frame, and rescales to the same size. In a first embodiment, resealing is applied to the original test video frame and the original reference video frame. In an alternative embodiment, the resealing module 18 receives a test video frame and a reference video frame that have been cropped and the blanking removed. As shown, the resealing module 18, as the capability receive either original or cropped inputs. In an embodiment of the resealing module the images are resealed using corner to corner mapping. In one embodiment, the test video frame is resealed to match the reference video frame. In another embodiment, the reference video frame is rescaled to match the test video frame. In a further embodiment, the resealing module rescales the larger video frame down to match the smaller video frame regardless of which is the test or reference. Alternatively, the smaller video frame could be upscaled to match the larger video frame. In some cases, both images will already be at the same scale. In this case, the corner to corner mapping may not make a discernable difference in the images.

The resealing module 18 provides rescaled test and reference video frames to a refined alignment measurement module 20. The module 20 comprises a one dimensional refined measurement module 22A that provides image matching over scale and offset along with an aggregation module 24. In a further embodiment, a second one dimensional refined measurement module 22B is also provided to accept rotated images provided by a rotation module 26 The aggregation module 24 aggregates one, or more of the following measurements: cropping, crude scale, crude offset, refined scale and refined offset. As shown, the aggregation module receives inputs from the border module 16 and the resealing module 18, in addition to the one dimensional refined alignment measurement modules. By rotating the image 90 degrees, it is possible to provide two dimensional analysis along both horizontal and vertical directions. The aggregation module provides a spatial distortion measurement result 30 as an output.

FIG. 4 illustrates additional detail for the one dimensional refined alignment measurement modules 22. The module 22 receives resealed frames corresponding to test and reference video sequences. A representative line module 44 provides a representative line (RL) for both the reference and test video frames. The RL will be either a horizontal representative line or a vertical representative line depending upon whether it is connected as the module 22A or the module 22B. Once a representative line (RL) is provided the LPCCC module 46 provides a Local Pearson's Cross-Correlation Coefficient (LPCCC) image. The Hough Transform module 48 performs a Hough Transform on the LPCCC image and provides an output to the pixel intensity module 50 that provides the coordinates of the pixel with the maximum intensity. Module 22 provides a refined alignment measurement result to the aggregation module of FIG. 3.

An embodiment of a method for performing the measurement comprises the following steps:

Measure and remove the borders from the test video frame, or the reference video frame, or both. Determine the location of the edge of each test image video frame and reference image video frame. In an embodiment of the present method this is achieved by determining how many pixels on the right, left, top and bottom of an image video frame are blanking or border pixels, rather than the active portions of the image. The active portion refers to the portion of the image that typically changes with time in a video sequence, which also corresponds to the portions of the video sequence that is typically of interest to the viewer. The corresponding identified active portions of the test image and the reference image will be used for subsequent measurement processing.

Make the active portions of the test image and the reference image match in both the horizontal and vertical dimensions. Active portions refers to the area within borders or blanking along the edges of the frame. Through out this description the active portions may also be referred to as the active image, as this is what is being used for the subsequent measurement processing. In a first embodiment, this is achieved by resealing the larger of the two active image portions down to match the smaller of the two. This produces two images with the same resolution. For example, if a 704 pixel wide by 480 pixel high active test image portion and a 1920 by 1080 active reference image portion are provided as input video frames, the resulting active test image portion and active reference image portion will both be 704 by 480 due to the larger active reference image portion being resampled down to match the smaller active test image portion. This method provides a quick way to match the two images. In effect, the two active image portions are mapped to one another corner to corner. This method performs accurate measurements regardless of aspect ratios. Changes in aspect ratios may be inferred from measurement results: For example, if horizontal and vertical scales are both 1, but test side cropping is 75% of total, this implies the test aspect ratio has changed accordingly. Differences in aspect ratio are accounted for in the next step, the refined alignment. However, this first step, the crude alignment, is helpful because it is a low computational cost method to reduce the dynamic range over which the computationally more expensive refined alignment needs to work. In a second embodiment, the smaller image is rescaled to match the larger image. This second method is not as fast as the first method, but can improve accuracy.

Figure 6:
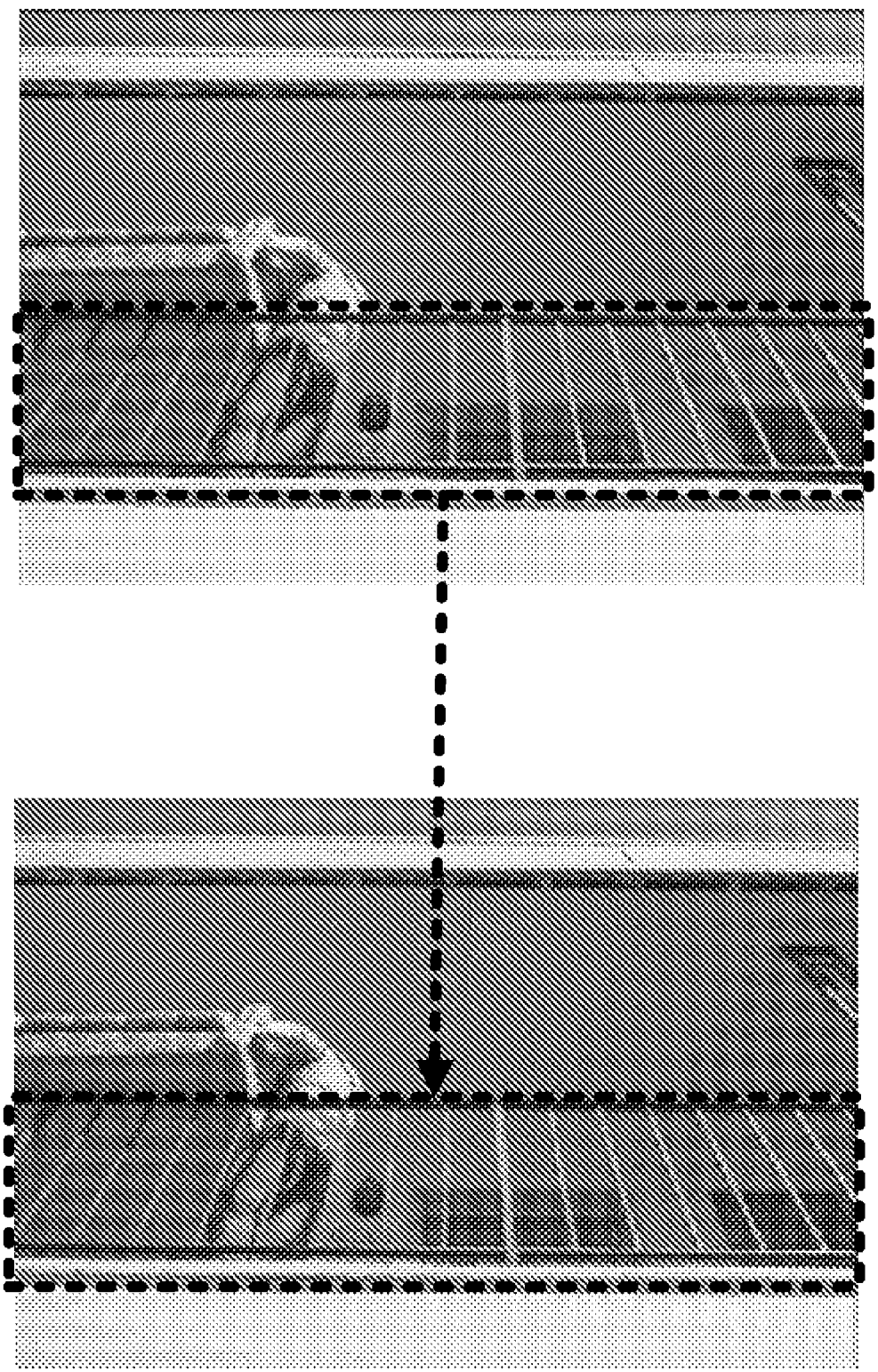
FIG. 6 is a depiction of image segment registration.

Obtain a representative line (RL) from each of the test and reference images; TestRL and ReferenceRL. In a first embodiment, a maximum variance line method is used to obtain each representative line. Find the highest variance test line (HVTL) from the active test image, which corresponds to TestRL, and the corresponding reference line (ReferenceRL) in the active reference image. Select a vertical image segment from the active test image. A test image segment is defined by including an equal number of lines above and below the HVTL. This selected test image segment is registered to the reference image using 2-D correlation and a search window centered at the reference line with maximum variance, provided that it is within the cropping tolerance and search window. In the example shown in FIG. 6, the top image is the active test image and the bottom image is the active reference image. In an embodiment of this method step, a spatial registration of the active test image segment to the active reference image is that used in measuring ANSI T1.801.03-1996, 5.4 (Active Video Shift). Alternative methods may also be used, such at the spatial registration method used in ANSI T1.801.02-2006 6.1 (Spatial Registration). Either method searches for the optimal metric corresponding to the best match over spatial shift for a vertical segment in order to find which reference line corresponds to the test line with the greatest variance. The center line of the corresponding reference vertical segment is selected as the reference RL (ReferenceRL) while the HVTL is used as the test RL (TestRL) for subsequent processing.

In a second embodiment, a line averaging method is used to obtain representative line (RL) candidates. This method creates an average line by a pixel-wise line averaging:

ReferenceRL(pixel)=sum over line(Reference(pixel, line))

TestRL(pixel)=sum over line(Test(pixel,line))

If both the reference representative line candidate (ReferenceRL) and the test representative line candidate (TestRL) have a valid edge, such that it is not DC or flat, the ReferenceRL and TestRL are used as the reference lines for subsequent processing. If either, or both, reference line candidates have no edges, the previous described maximum variance line method is used to obtain reference lines.

Figure 7:
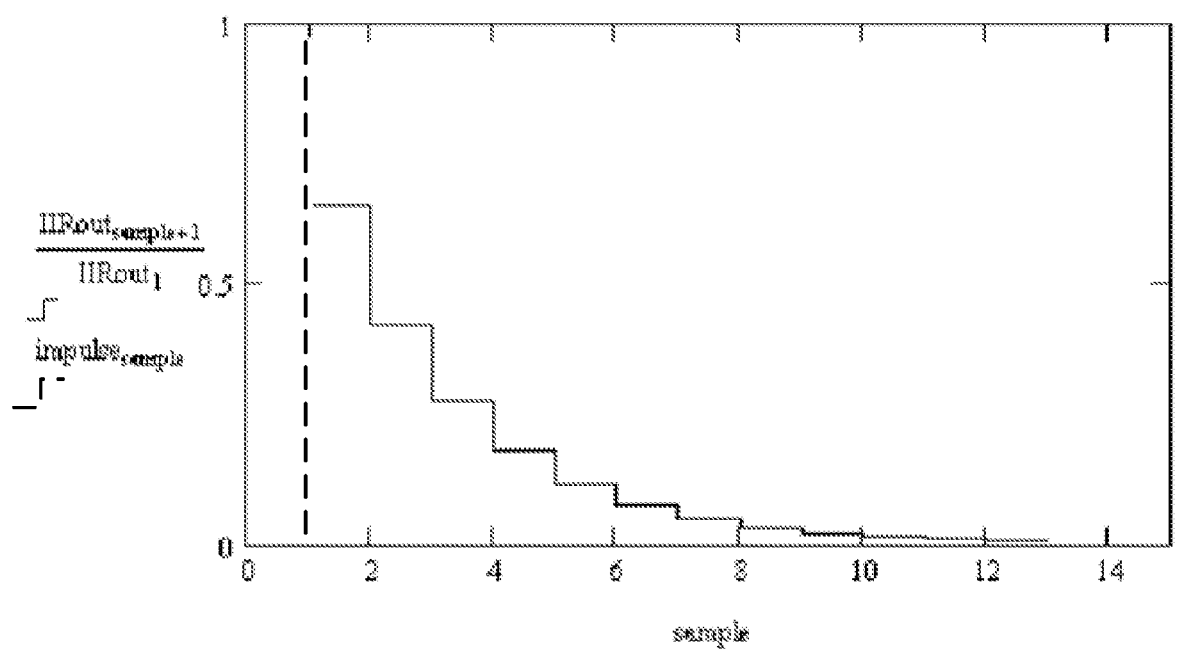
FIG. 7 shows a single-pass equation and response of dual pass IIR LPF used in "local" statistical calculations.

Once a representative line has been obtained for both the active test image and the active reference image, a local Pearson's cross-correlation coefficient (LPCCC) image is created at different horizontal shifts. In an embodiment of the method, each line of the LPCCC image is generated using as inputs the representative line of the active reference image and horizontally shifted versions of the representative line of the active test image, locally cross-correlated using a one dimensional version of the general method used in the local two dimensional correlation taught in U.S. Pat. No. 6,975,776 "Predicting Human Vision Perception and Perceptual Difference," which is hereby incorporated herein by reference. This method of calculating cross-correlation on a local basis amounts to extrapolating the concepts of discrete ensemble measures to that of continuous measures. The discrete ensemble measures include for example mean, variance, and covariance. The continuous measures include for example local means taken as IIR LPF output, local variance taken as IIR LPF processed differences of pixel values and local means of pixel values. The local variance taken as an infinite impulse response low pass filter (IIR LPF) processed differences of pixel values and local means of pixel values is one example of a continuous measure. The IIR LPF may be implemented as a recursive filter as shown in FIG. 7, applied once forwards on the input line and then again backwards on the intermediate output from the forward direction. In effect, every summation used in discrete statistical calculations can be replaced with an IIR LPF operation. Whereas the Pearson's correlation coefficient is calculated as the covariance divided by the square root of the product of test and reference variances, the LPCCC is calculated for each pixel of the corresponding representative line of the active reference image (ReferenceRL) as the local covariance divided by the square root of the product of test and reference local variances. For each ReferenceRL pixel, the local covariance is calculated as the IIR LPF applied to the product of the ReferenceRL pixel deviation from the local ReferenceRL pixel mean and the corresponding test reference line (TestRL) pixel deviation from local TestRL pixel mean. The pixel means result from subjecting the respective lines to the IIR LPF. So, the LPCCC[row][column] image is given by:

LPCCC[shift][n]=LocalCovariance(TestRL[shift], ReferenceRL)[n]/ Sqrt(LocalVariance(TestRL [shift])[n]*LocalVariance(ReferenceRL)[n])

Where

Figure 8:
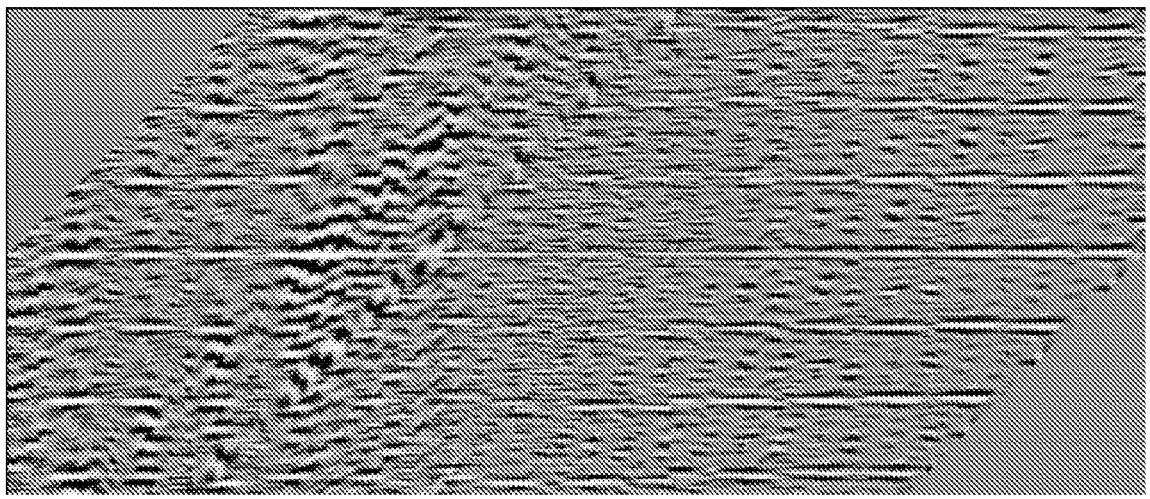
FIG. 8 is a local Pearson's cross-correlation coefficient (LPCCC) image.

IIR_LPF(X)[n]=nth output of the IIR LPF of FIG. 8 applied successively in both directions to input image line X. Thus, IIR_LPF(X)[n] is the local mean of X at the nth pixel.

LocalVariance(X)[n]=(X[n]-IIR_LPF(X)[n])^2

LocalCovariance(X, Y)[n]=IIR_LPF((X[n]-IIR_LPF (X)[n])*(Y[n]-IIR_LPF(Y)[n]))[n]

The filter is initialized with X[0] in the forward pass and equivalently for the reverse pass.

The TestRL shift range corresponds to the ratio of the TestRL to ReferenceRL image scale range the algorithm can detect. Higher shift ranges, which correspond to scale measurement ranges, have a correspondingly higher computational cost.

Find the highest average line intensity across the LPCCC image. The slope of this line corresponds to the ratio of the TestRL and ReferenceRL image scales, whereas the y intercept corresponds to the shift=spatial offset. Example LPCCC images are shown in FIGS. 8 through 13. Nonlinear distortions, such as nonlinear stretch, for example "fish-eye" lens type distortion, result in corresponding deviations from a straight line in the LPCCC image. Thus, the LPCCC may be used as a type of waveform monitor display to check scale, offset and linearity of the spatial mapping of test to reference.

FIG. 8 illustrates a Pearson's Correlation Coefficient+128 (intensity) vs pixel (Horizontal) vs pixel (Vertical): Each line is the LPF'd dot product of local ref and test AC divided by the product of the two local standard deviations. Ref+Test in this example: H scale ration=1.0. Parameters: LPF: a1=0.65, Horizontal shift search window −+/−150 pixels.

Figure 9:
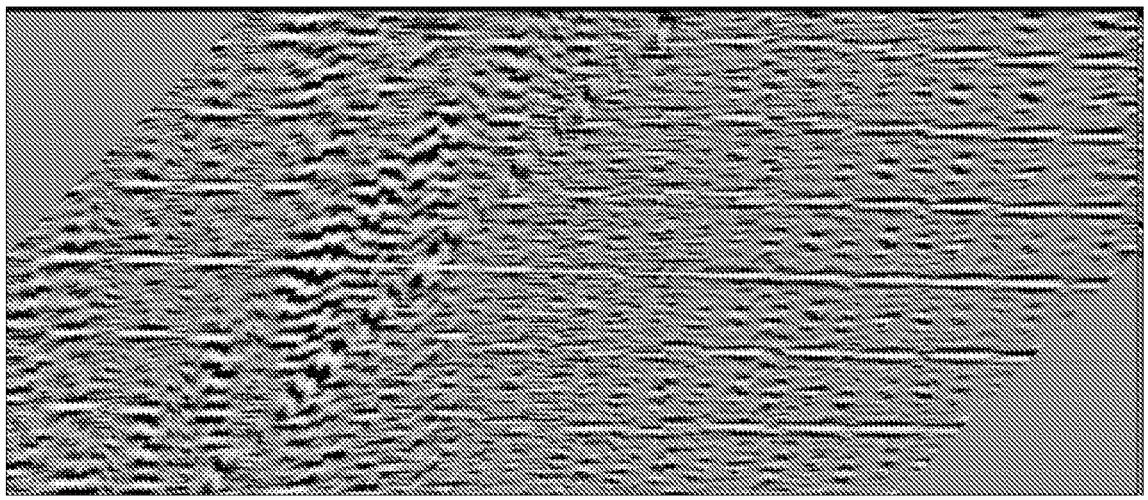
FIG. 9 is an LPCCC image corresponding to FIG. 8, but with a horizontal scale slightly greater than 1.0.

FIG. 9 corresponds to FIG. 7, but with a horizontal scale slightly greater than 1.0.

Figure 10:
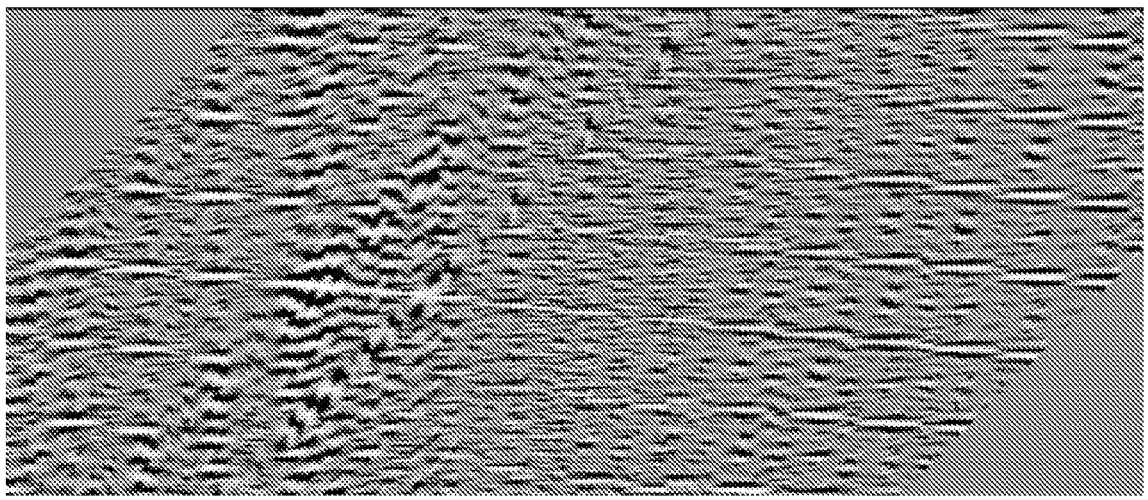
FIG. 10 is an LPCCC image corresponding to FIG. 8, but with a horizontal scale of 1.1.

FIG. 10 corresponds to FIG. 7, but with a horizontal scale of 1.1.

Figure 11:
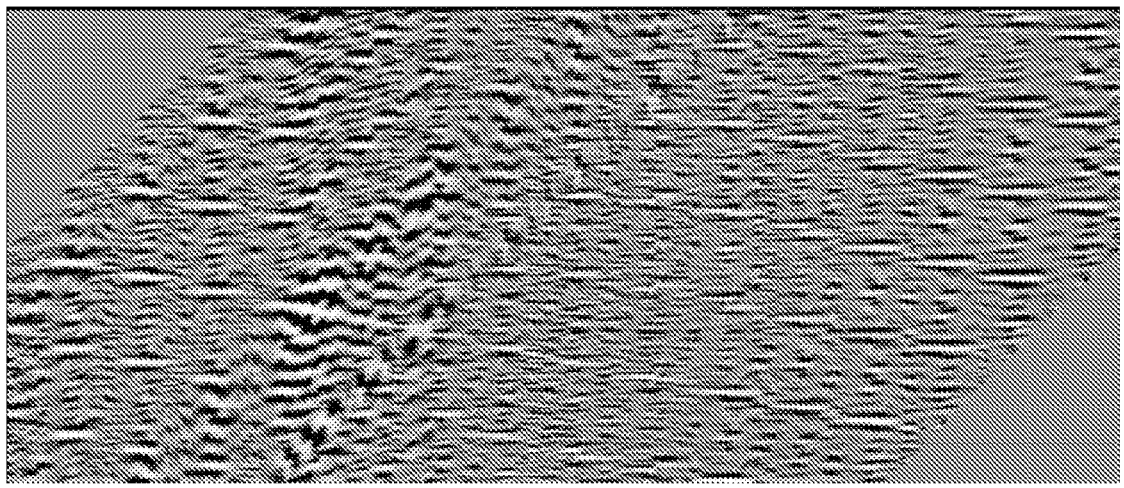
FIG. 11 is an LPCCC image corresponding to FIG. 8, but with a horizontal scale of 1.2.

FIG. 11 corresponds to FIG. 7, but with a horizontal scale of 1.2.

Figure 12:
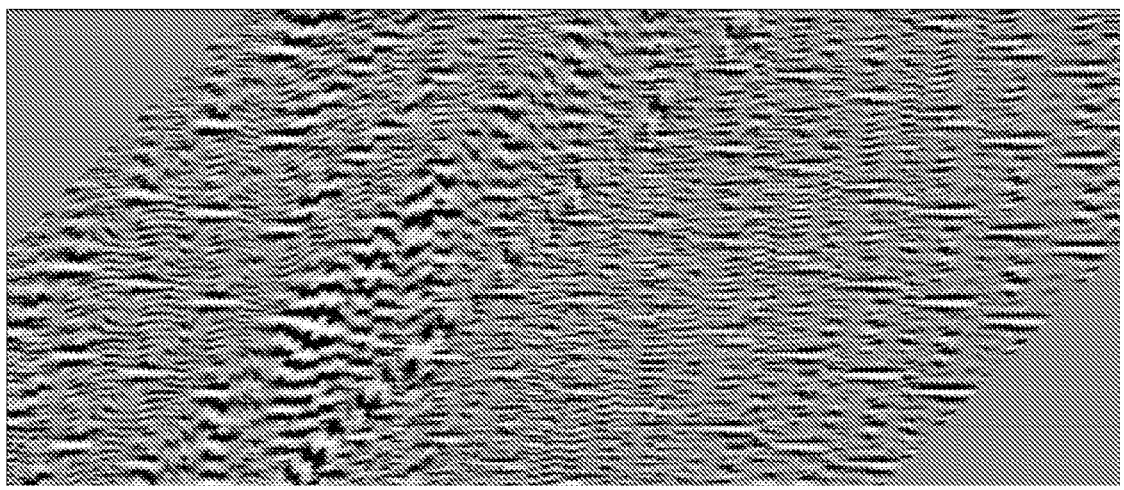
FIG. 12 is an LPCCC image corresponding to FIG. 8, but with a horizontal scale of 1.25.

FIG. 12 corresponds to FIG. 7, but with a horizontal scale of 1.25.

Figure 13:
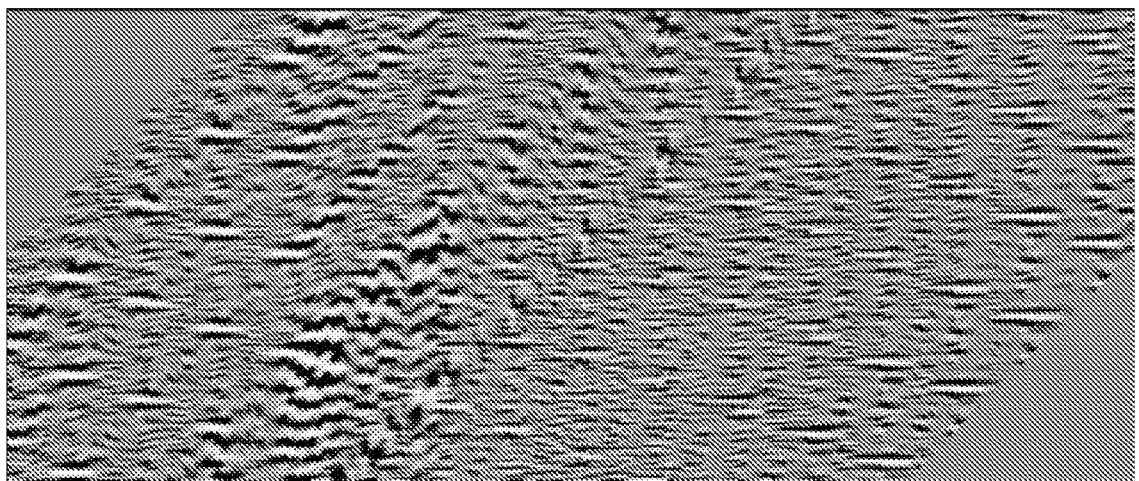
FIG. 13 is an LPCCC image corresponding to FIG. 8, but with a horizontal scale of 1.35.

FIG. 13 corresponds to FIG. 7, but with a horizontal scale of 1.35.

In an embodiment of the method, a linear gray-scale Hough Transform is used to identify the line with the highest average intensity. Each pixel/Point in the LPCCC image maps to a Hough Transform line via a parametric line equation:

Input image=LPCCC[row=y][column=x] with x=original image pixel index, y=horizontal shift for correlation−maximum negative shift For each LPCCC (x,y), map to Hough Transform[Theta, R] for each Theta (parameterized using the Theta increment index ThetaAngleBin):

Theta[ThetaAngleIndex]=−PI*ThetaAngleIndex/ ThetaIndexMax (where PI is the constant pi ($\pi$))

R=x*cos(Theta)+y*sin(Theta)

HoughTransformImage[ThetaAngleIndex][R]+ =LPCCC

Note that non-linear scaling, such as that cause by fish-eye distortion, will result in corresponding distortions in the brightest line of the LPCCC. This nonlinearity may also be measured using higher order Hough transforms, for example, or other existing methods for determining nonlinear curve parameters in the presence of noise.

Find coordinates of the Hough Transform image pixel with the maximum intensity (maxHough[ThetaAngleBin][R] intensity). This defines the best fit line through the LPCCC image, corresponding to the scale and offset of the TestRL relative to the ReferenceRL. FIGS. 14-17 provide examples of Hough Transform images.

Figure 14:
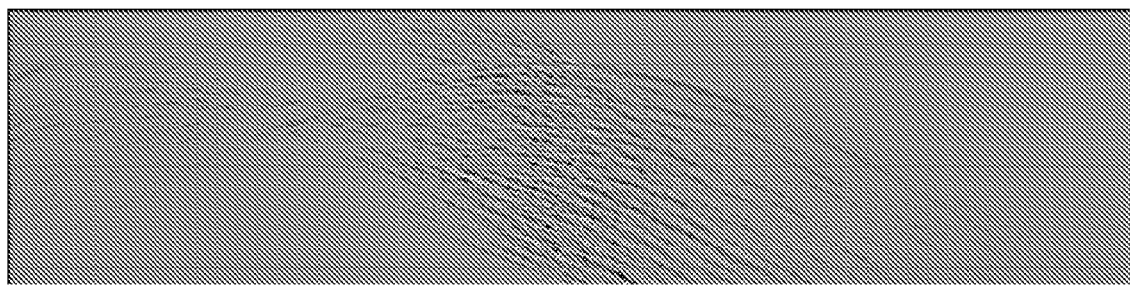
FIG. 14 is a Hough Transform of the image in FIG. 8, but with a scale of 0.7.

FIG. 14 illustrates a Hough Transform of a Pearson's Correlation Coefficient+128(intensity) vs pixel (Horizontal) vs pixel (Vertical) corresponding to FIG. 8, except with a scale of 0.7. The Hough Transform Example has the form R=x*cos (Theta)+7*sin(Theta) vs Theta. Horizontal dimension of 720 pixels, Theta=−PI to 0, vertical dimensions of 176 pixels, R=0 to 352.5. The bright dot is located at Theta=−1.864139 at a horizontal scale equal to 0.699034, which is very close to the actual 0.7 horizontal scale used corresponding to 0.994 pixels error/704.

Figure 15:
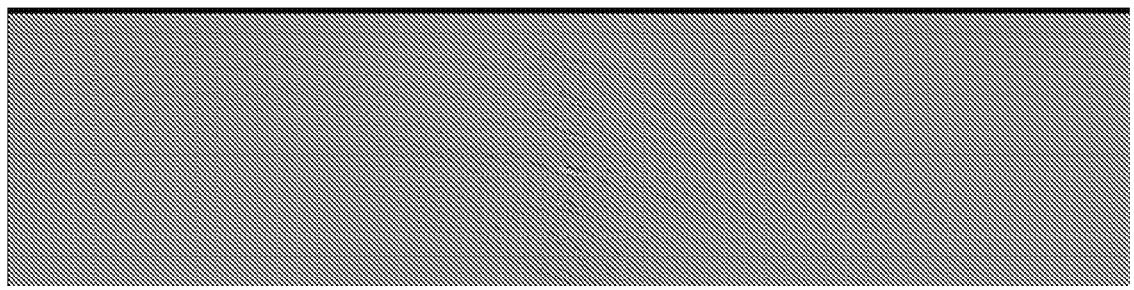
FIG. 15 is a Hough Transform of the image in FIG. 8, but with a scale of 1.005.

FIG. 15 illustrates a Hough Transform of a Pearson's Correlation Coefficient+128(intensity) vs pixel (Horizontal) vs pixel (Vertical) corresponding to FIG. 8, except with a scale of 1.005. The Hough Transform Example has the form R=x*cos(Theta)+7*sin(Theta) vs Theta. Horizontal dimension of 720 pixels, Theta=−PI to 0, vertical dimensions of 176 pixels, R=0 to 352.5. The bright dot is located at Theta=−1.566543 at a horizontal scale equal to 1.004363, which is very close to the actual 1.005 horizontal scale used corresponding to 0.456 pixels error/704.

Figure 16:
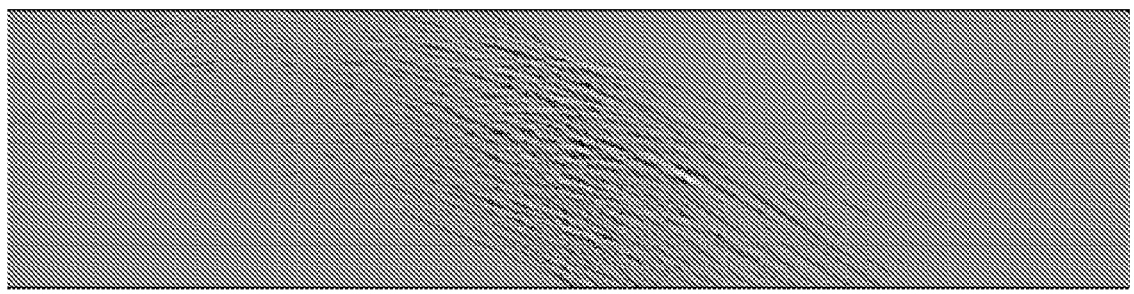
FIG. 16 is a Hough Transform of the image in FIG. 13, but with a scale of 1.35.

FIG. 16 illustrates a Hough Transform of a Pearson's Correlation Coefficient+128(intensity) vs pixel (Horizontal) vs pixel (Vertical) corresponding to FIG. 8, except with a scale of 1.35. The Hough Transform Example has the form R=x*cos(Theta)+7*sin(Theta) vs Theta. Horizontal dimension of 720 pixels, Theta=−PI to 0, vertical dimensions of 176 pixels, R=0 to 352.5. The bright dot is located at Theta=−1.234820 at a horizontal scale equal to 1.349216, which is very close to the actual 1.35 horizontal scale used corresponding to 0.418 pixels error/704.

Figure 17:
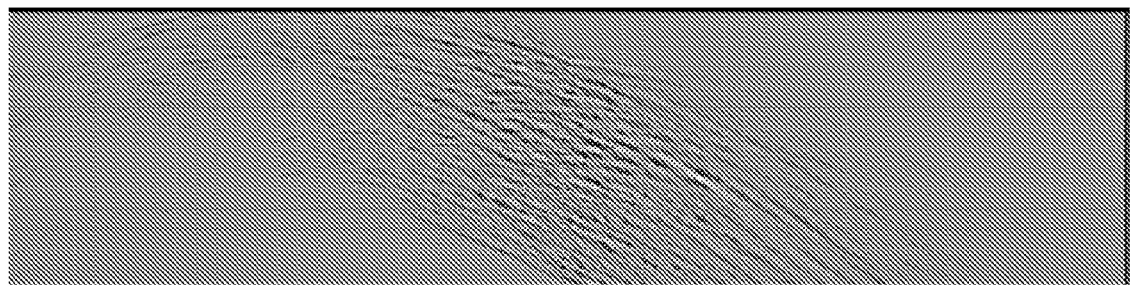
FIG. 17 is a Hough Transform of the image in FIG. 8, but with a scale of 1.4.

FIG. 17 illustrates a Hough Transform of a Pearson's Correlation Coefficient+128(intensity) vs pixel (Horizontal) vs pixel (Vertical) corresponding to FIG. 8, except with a scale of 1.4. The Hough Transform Example has the form R=x*cos (Theta)+7*sin(Theta) vs Theta. Horizontal dimension of 720 pixels, Theta=−PI to 0, vertical dimensions of 176 pixels, R=0 to 352.5. The bright dot is located at Theta=−1.191187 at a horizontal scale equal to 1.39896, which is very close to the actual 1.4 horizontal scale used corresponding to 0.535 pixels error/704.

Convert Hough Transform Theta and R to spatial scale and offset. In an embodiment of this method the conversion is accomplished using the following equation:

refinedScale=1+tan(ThetaMaxHough+(*PI*/2))

nominalVerticalDatum=LPCCC_Height/2 yIntercept=RMaxHough/sin(ThetaMaxHough)

refinedOffest=nominalVerticalDatum−yIntercept

Calculate refined scale and offset for the vertical dimension. In one embodiment, this is achieved by reusing the same method described above, starting with obtaining a representative line (RL) from each of the test and reference images, and using 90 degree rotated versions of the active test image and the active reference image.

The crude and refined offsets and scale values are combined to give total horizontal and vertical scale and offset values. Likewise the blanking and border measurements can be used in combination with the refined measurements to give corresponding cropping measurements, as would be clearly understood by those skilled in the art.

What is claimed is:

1. A measurement apparatus for measuring video frames comprising:
   a crude alignment module receiving a test video frame and a reference video frame and performing crude alignment of the frames;
   a representative line module receiving the test video frame and the reference video frame following crude alignment and providing a representative test line and a representative reference line;
   a Local Pearson's Cross-Correlation Coefficient (LPCCC) module creating an LPCCC image based upon the representative test and reference lines;
   a Hough Transform module performing a Hough Transform on the LPCCC image;
   a pixel intensity module to identify the pixel with maximum intensity from the Hough Transform of the LPCCC to provide a refined alignment measurement result; and
   an aggregation module to aggregate crude alignment measurements and refined alignment measurements and store them for further analysis.

2. The measurement apparatus of claim 1, wherein the crude alignment module further comprises a border removal module.

3. The measurement apparatus of claim 1, wherein the crude alignment module further comprises a resealing module match the scale of the test video frame and the reference video frame.

4. The measurement apparatus of claim 3, wherein the resealing module scales the test video frame to match the reference video frame.

5. The measurement apparatus of claim 3, wherein the resealing module scales the reference video frame to match the test video frame.

6. The measurement apparatus of claim 3, wherein the resealing modules scales whichever frame is larger to match whichever frame is smaller.

7. The measurement apparatus of claim 1, further comprising a rotation module to rotate the image for subsequent processing along a second axis.

8. The measurement apparatus of claim 1, where in the representative line module provides a representative line by identifying the maximum variance line.

9. The measurement apparatus of claim 1, wherein the representative line module provides a representative line by line averaging.

10. A method of measuring video frames comprising:
    performing a crude alignment of a test video frame and a reference video frame;
    providing a representative line for each of the test video frame and the reference video frame following crude alignment;
    creating a Local Pearson's Cross-Correlation Coefficient (LPCCC) image based upon the representative test and reference lines;
    performing a Hough Transform on the LPCCC image;
    identifying the pixel with maximum intensity from the Hough Transform of the LPCCC to provide a refined alignment measurement result; and
    aggregating crude alignment measurements and refined alignment measurements and storing them for further analysis.

11. The method of claim 10, wherein the crude alignment further comprises a removing the border.

12. The method of claim 10, wherein the crude alignment further comprises a resealing the test video frame and the reference video frame to the same scale.

13. The method of claim 12, wherein the resealing step scales the test video frame to match the reference video frame.

14. The method of claim 12, wherein the resealing step scales the reference video frame to match the test video frame.

15. The method of claim 12, wherein the resealing step scales whichever frame is larger to match whichever frame is smaller.

16. The method of claim 12, further comprising rotating the image for subsequent measurement along a second axis.

17. The method of claim 10, wherein the step of providing a representative line provides a representative line by identifying the maximum variance line.

18. The method of claim 10, wherein the step of providing a representative line provides a representative line by line averaging.

* * * * *